July 5, 1938.  O. H. MOHR  2,122,821
SOLAR HEATER
Filed April 22, 1936   2 Sheets-Sheet 2

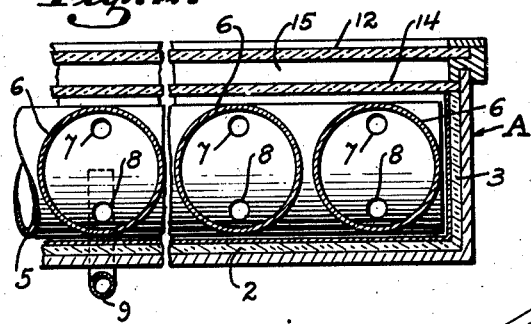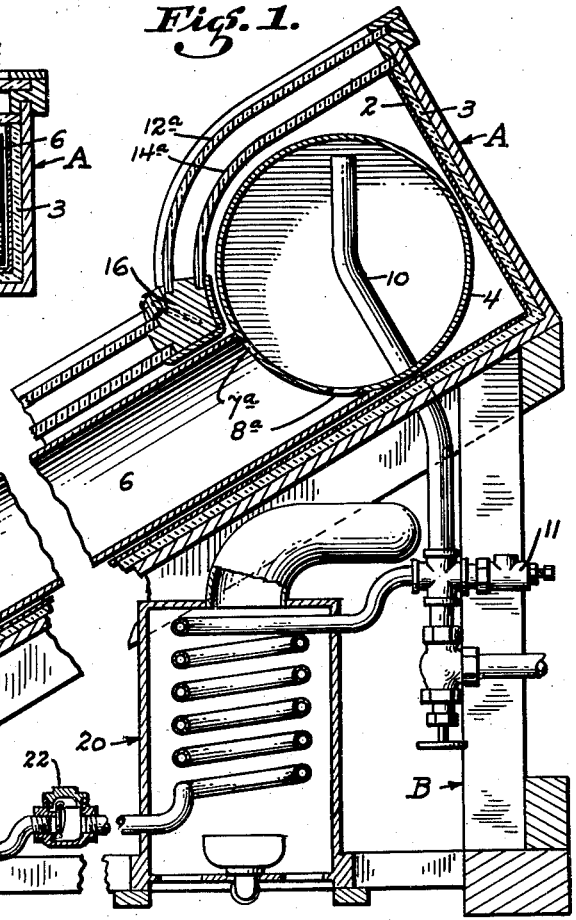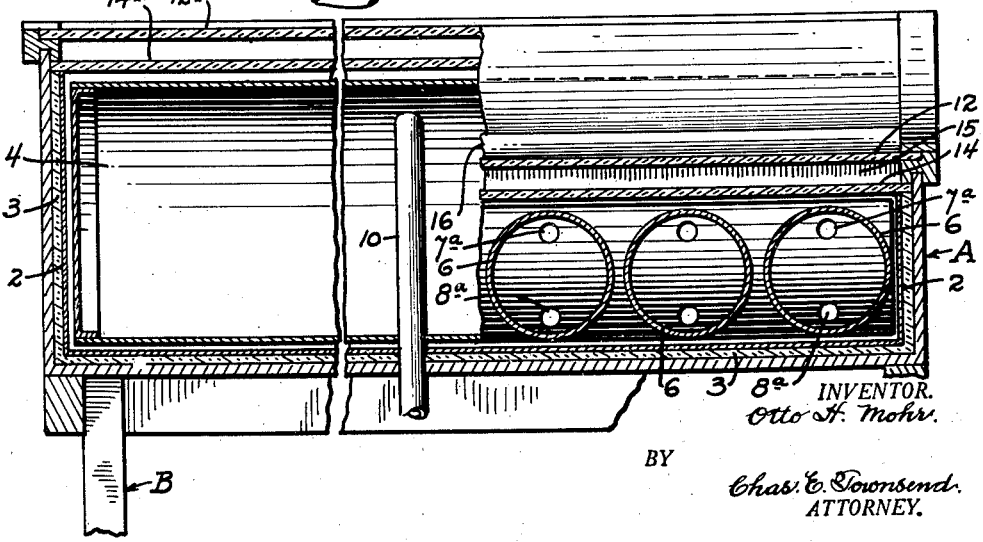

INVENTOR.
Otto H. Mohr.
BY
Chas. E. Townsend.
ATTORNEY.

Patented July 5, 1938

2,122,821

UNITED STATES PATENT OFFICE 2,122,821

SOLAR HEATER

Otto H. Mohr, Concord, Calif.

Application April 22, 1936, Serial No. 75,741

2 Claims. (Cl. 126—271)

This invention relates to solar heaters especially intended for heating water and similar liquids or fluids.

The object of the present invention is generally to improve and simplify the construction and operation of heaters of the character described; to provide a heater consisting of a series of spaced upwardly inclined tubes connected at their upper and lower ends by headers, said tubes and headers being made of a metal, such as copper or the like, having a high coefficient of heat conductivity and being painted or colored black to absorb the greatest amount of heat possible when exposed to radiation; to provide a housing or box for the reception and support of the heating tubes and headers, said box being insulated to retain heat and being covered with two or more layers of glass with an intermediate dead air space to reduce conduction losses to a minimum; to provide an arrangement of tubes and headers which does not only function as a solar heater but also as a hot water storage reservoir; to provide a coal, gas, or electrically operated auxiliary heater for heating and circulating water in the solar heater when necessary; to provide an improved connection between the heating tubes and the respective headers whereby convection and thermo-siphon circulation of the water in the heater may be utilized to the greatest advantage; and, further, to provide a lining within the housing whereby both direct and reflected radiant energy may be utilized to heat the tubes and the headers.

The solar heater is shown by way of illustration in the accompanying drawings, in which—

Fig. 1 is a central, vertical cross section of the solar heater;

Fig. 2 is a partial longitudinal cross section taken on line II—II of Fig. 1;

Fig. 3 is a cross section taken on line III—III of Fig. 4;

Figure 4:
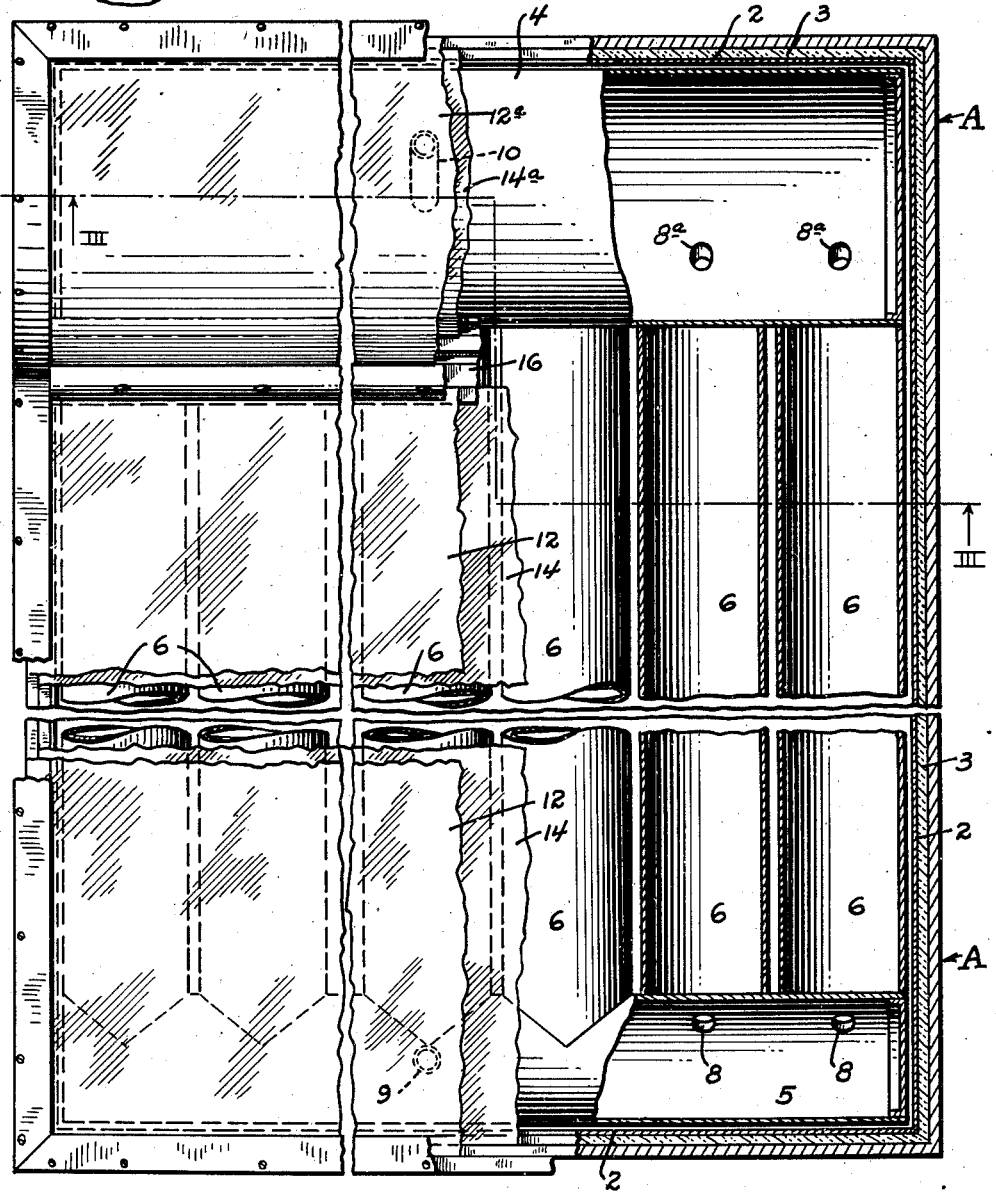
Fig. 4 is a plan view of the heater, said view being partially broken away and being partially shown in section.

Referring to the drawings in detail, and particularly Figs. 1 and 4, A indicates in general a housing having the general shape of a shallow rectangular box. The housing may be constructed of lumber, or like material, and is supported in an inclined position by a timber frame B; the degree of inclination depending upon the latitude in which the heater is employed. The interior surface of the housing is lined with metal 2 having a reflecting surface, and insulating material 3 of suitable nature is interposed between the lining and the lumber, or other material from which the housing is built, to retain heat within the housing and to reduce conduction losses.

Extending lengthwise of the housing parallel to the upper end is a header 4 of comparatively large diameter and parallel to the lower end of the housing is a header 5 of smaller diameter. The headers are connected by parallel spaced tubes 6 and the tubes, together with the headers, are constructed of copper, or a like metal, having a high coefficient of heat conduction; the tube and headers being, furthermore, colored or painted black to give the greatest degree of heat absorption possible. The tubes 6 connecting the respective headers are welded, or otherwise secured, to the headers and in order to maintain convection and thermo-siphon circulation through the tubes and between the headers, openings 7 and 8 are made in the lower header in alignment with each tube 6 and similar openings $7^a$ and $8^a$ are made in the upper header in alignment with each tube; that is, when the headers and tubes are exposed to solar radiation the upper surfaces of the headers and tubes will absorb the greatest amount of heat and the water adjacent them will in turn, be heated by conduction.

The heated water will, accordingly, flow upwardly through the openings 7 and $7^a$, while the cooler water lying in the bottom of the headers and the bottom of the tubes will return through the openings $8^a$ and 8. The arrangement of the openings 7, 8, $7^a$ and $8^a$ is such that convection and thermo-siphon circulation is maintained at the greatest efficiency possible. The water, or other liquid or fluid medium to be heated, enters the lower header through a pipe 9 which may be connected with any suitable source of supply. The hot water to be removed from the heater discharges through a pipe 10 which is connected with the upper header. A safety valve 11 is placed on the discharge pipe and this may be set for any degree of pressure desired. The circulation of hot water takes place within the heater itself and not through the pipes connecting the same and due to the size of the heater and the cubic capacity of the tubes 6, and particularly the upper header, it is possible to utilize the heater not only for the purpose of heating and circulating the water but also to utilize it as a water storage reservoir.

The housing is covered with two or more layers of glass, as indicated at 12 and 14, the glass being disposed in a suitable frame and the two layers of glass being spaced apart as shown at 15 to form a dead air space for insulating purposes. The glass covering is in this instance shown as made in two sections. The lower section, which is flat, is indicated by the numerals 12 and 14, and the upper section in which the glass covers are curved is shown at 12ᵃ and 14ᵃ. An intermediate frame 16 is employed to support the upper ends of the glasses 12 and 14 and the lower ends of the glasses 12ᵃ and 14ᵃ.

In actual practice the heater will be placed in a position where it will get the greatest possible sun exposure during the day. The radiant energy from the sun will strike the tubes and the headers directly and it will also strike the reflecting lining and the tubes and headers will, accordingly, be heated not only by direct radiant energy but also by reflected energy. The heat, of course, is transmitted to the water or other fluid contained within the heater and as an efficient thermo-siphon circulating system is maintained the entire body of liquid or fluid will become uniformly and rapidly heated. Heat losses once the water or fluid has become heated will be exceedingly small due to the efficient manner in which the housing is insulated.

In climates where sun exposure is not any too constant an auxiliary heater, such as diagrammatically illustrated at 20, may be installed in the system. This may be heated by coal, gas, electricity, or any other suitable medium and will obviously only function as a stand-by when needed. In order to prevent circulation through the auxiliary heater when solar radiation and heating is taking place, a hinged type of check valve, such as shown at 22, is employed. This check will automatically stop circulation through the auxiliary heater not only when solar radiation is taking place but also at night and thereby reduces any cooling effect which would otherwise take place.

While certain features of the present invention have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. A solar heater of the character described comprising parallel upper and lower headers, and connector tubes disposed between the headers and forming ducts between the same, said tubes assuming an inclined position between the headers and said headers and tubes forming heaters and a reservoir for a liquid to be heated, said headers having pairs of upper and lower openings formed therein in alignment and in communication with the respective ends of each connector tube to control thermosiphon circulation of the liquid between the upper and lower headers through each connector tube.

2. A solar heater of the character described comprising parallel upper and lower headers, and connector tubes disposed between the headers and forming ducts between the same, said tubes assuming an inclined position between the headers and said headers and tubes forming heaters and a reservoir for a liquid to be heated, said headers having pairs of upper and lower openings formed therein in alignment and in communication with the respective ends of each connector tube to control thermosiphon circulation of the liquid between the upper and lower headers through each connector tube, means for delivering a cold fluid medium to the lower header, and a hot fluid discharge pipe connected with the upper header.

OTTO H. MOHR.